United States Patent [19]
Ogawa

[11] Patent Number: 5,392,086
[45] Date of Patent: Feb. 21, 1995

[54] CAMERA HAVING SIGNAL INPUT/OUTPUT DEVICE FOR CONTROL OF OR BY ANOTHER CAMERA

[75] Inventor: Hidehiro Ogawa, Funabashi, Japan

[73] Assignee: Nikon Corporation, Tokyo, Japan

[21] Appl. No.: 230,869

[22] Filed: Apr. 20, 1994

Related U.S. Application Data

[63] Continuation of Ser. No. 783,114, Oct. 25, 1991, abandoned.

[30] Foreign Application Priority Data

Oct. 30, 1990 [JP] Japan .................................. 2-290934
Oct. 30, 1990 [JP] Japan .................................. 2-290935
Oct. 30, 1990 [JP] Japan .................................. 2-290936

[51] Int. Cl.⁶ .............................................. G03B 17/38
[52] U.S. Cl. ...................................................... 354/266
[58] Field of Search .................... 354/266, 267.1, 269, 354/289.1, 293, 295, 76, 113, 132

[56] References Cited

U.S. PATENT DOCUMENTS

| 4,488,794 | 12/1984 | Dolgow et al. | 354/293 X |
| 4,805,037 | 2/1989 | Noble et al. | 354/76 X |
| 5,101,230 | 3/1992 | Shikaumi et al. | 354/430 |
| 5,162,829 | 11/1992 | Lynch et al. | 354/76 |

Primary Examiner—M. C. Gellner
Assistant Examiner—J. K. Han
Attorney, Agent, or Firm—Shapiro and Shapiro

[57] ABSTRACT

A camera comprises release input means having a release input/output terminal for receiving an external release signal to start a release operation of the camera, and release signal output means for outputting a release signal to the release input/output terminal to release another camera in response to depression of a release button of the camera. When a plurality of cameras are connected through a cable and the release operation is carried out in one camera, the other cameras are simultaneously released. In another aspect of the camera, when the camera detects that the other camera is in a release sequence and cannot receive the release signal, it does not output the release signal.

15 Claims, 7 Drawing Sheets

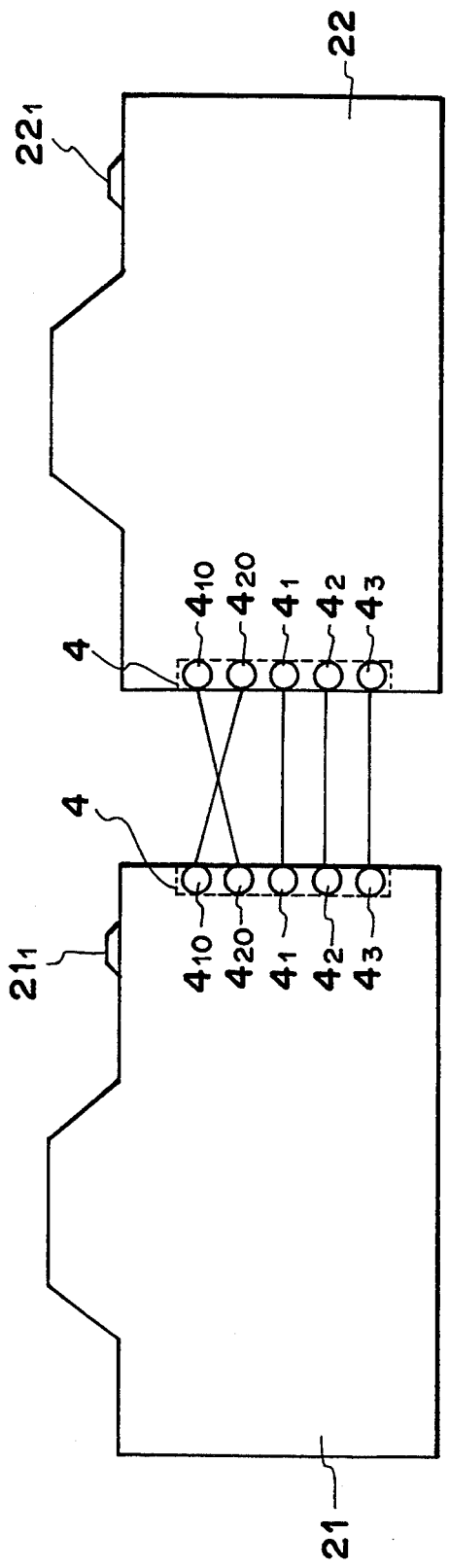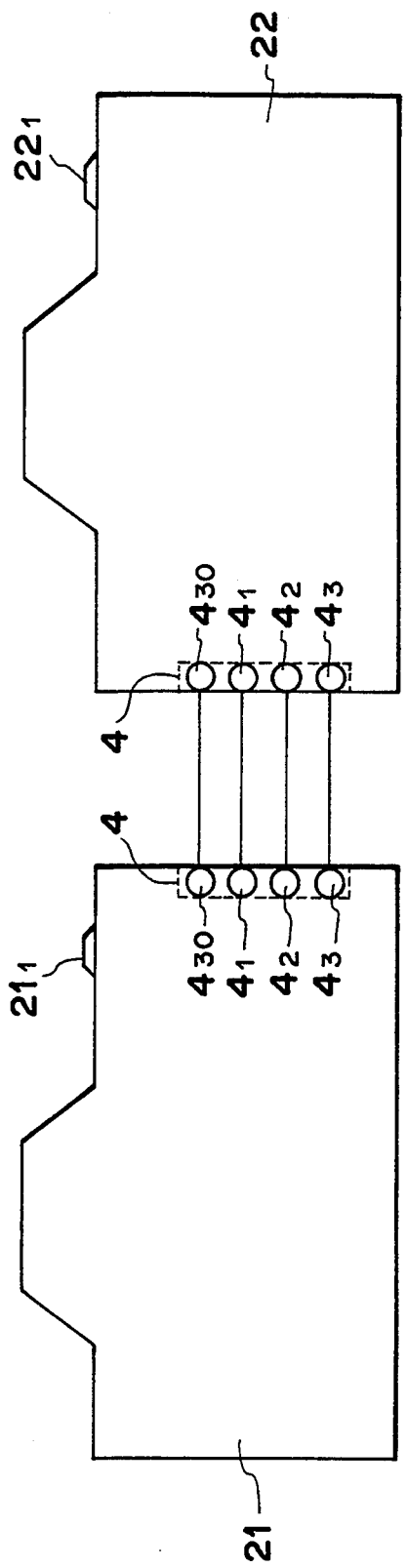

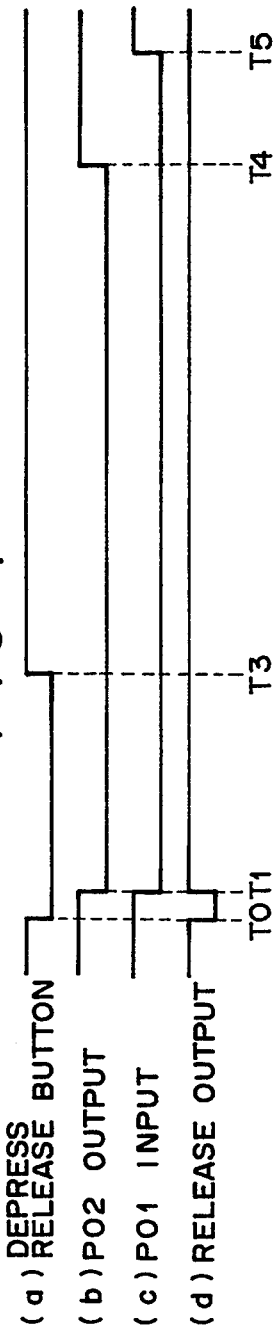
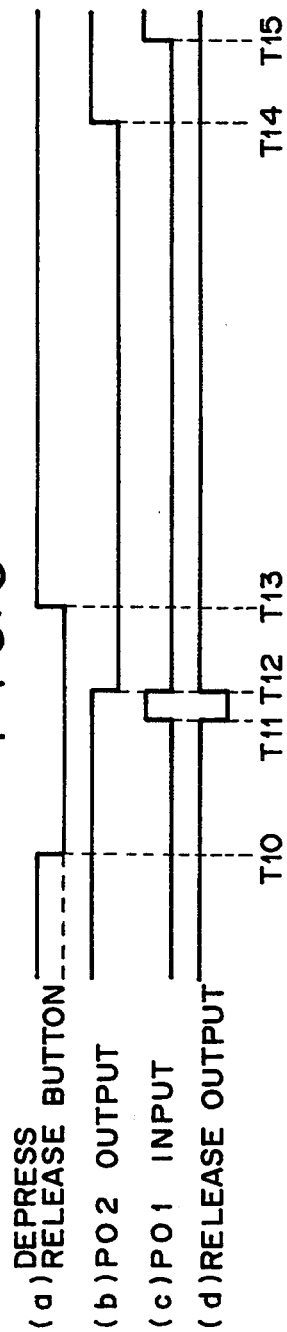
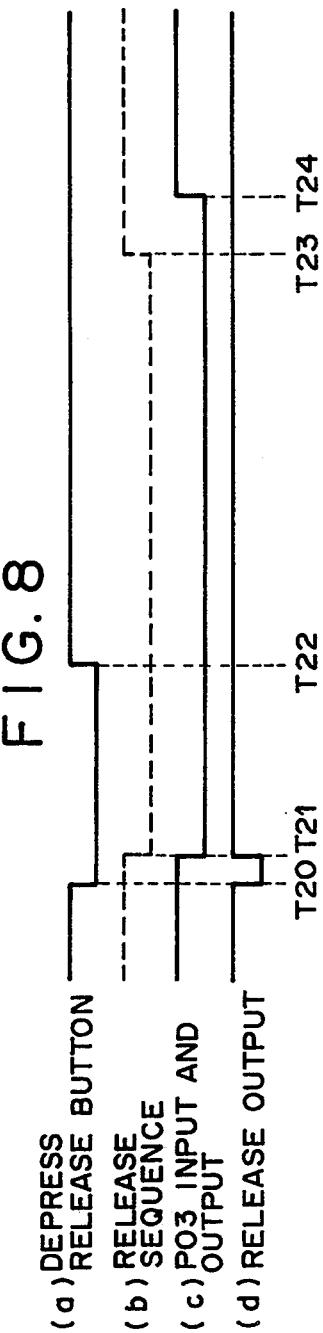

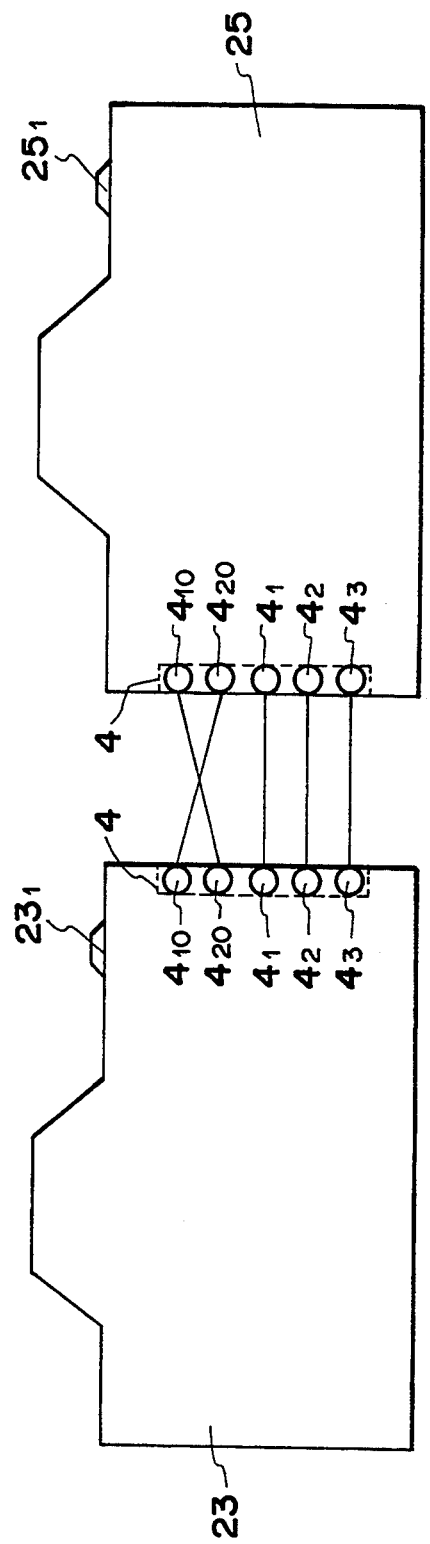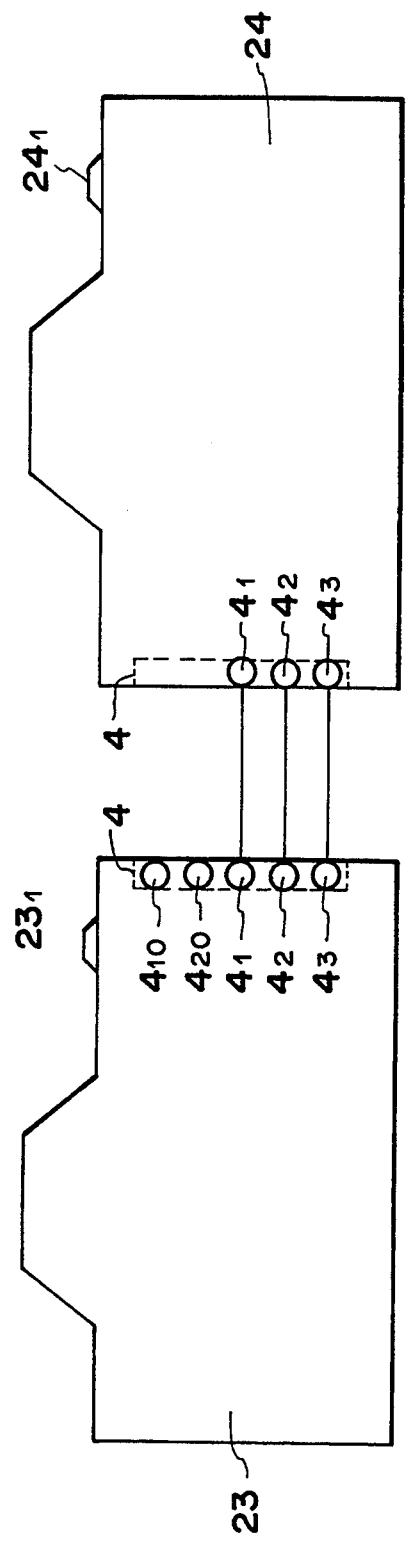

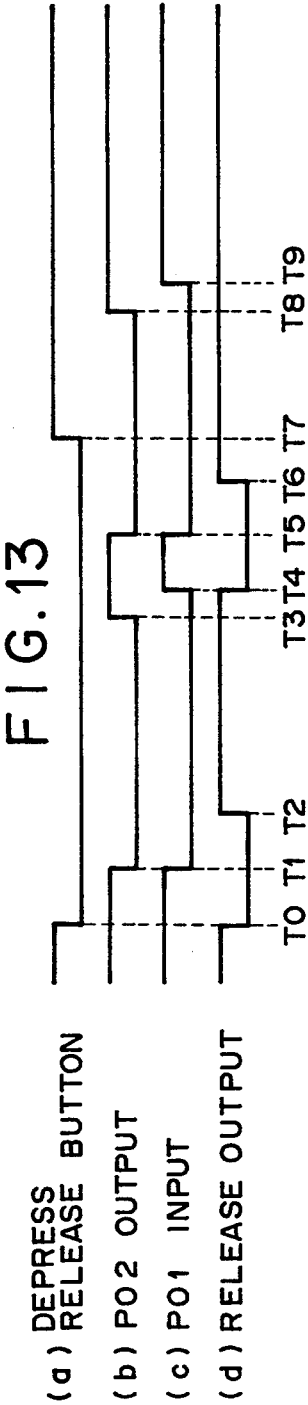
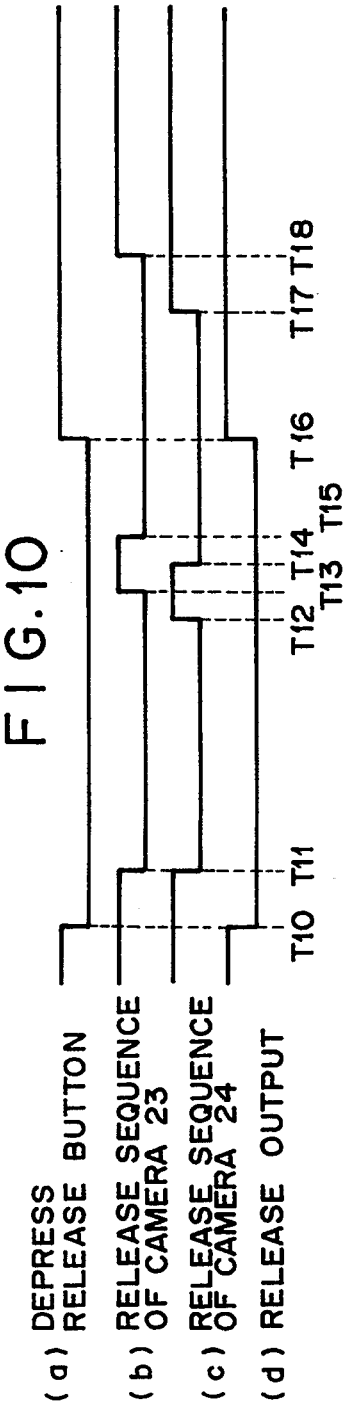
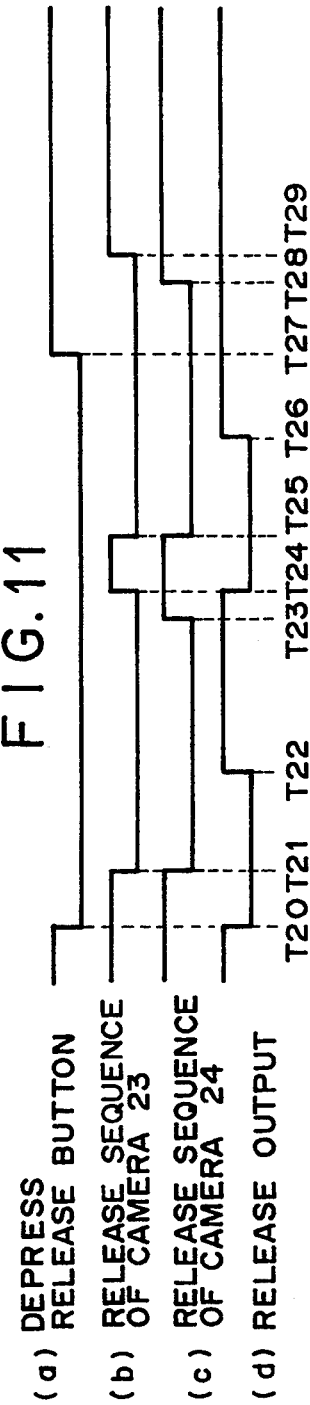

CAMERA HAVING SIGNAL INPUT/OUTPUT DEVICE FOR CONTROL OF OR BY ANOTHER CAMERA

This is a continuation of application Ser. No. 07/783,114, filed Oct. 25, 1991, now abandoned.

BACKGROUND OF THE INVENTION

1. Field of the Invention

The present invention relates to a camera having a connector to be connected to another camera so that the camera is started or released in synchronism with the other camera.

2. Related Background Art

In the past, when a plurality of cameras are to be simultaneously controlled, a cable is connected to connectors having release input terminals and a signal is applied to the cable to release the cameras simultaneously. Accordingly, it is necessary to connect the cable to the respective cameras to apply the release signal.

Further, in the prior art camera, it is not possible to recognize whether the camera is in a release inhibit status or not. The prior art camera also cannot release a plurality of cameras simultaneously when the interconnected camera has only release input means.

SUMMARY OF THE INVENTION

In order to solve the above problems, a camera of the present invention is constructed to release other cameras by connecting the other cameras by cables and releasing one of the cameras.

In accordance with the aspect of the present invention, there is provided a camera comprising:

start signal input means having a start signal input/output terminal for receiving an external start signal to start the camera;

release signal input means having a release input/output terminal for receiving an external release signal to start a release operation of the camera;

start signal output means for outputting a start signal to the start signal input/output terminal to start the other camera; and release signal output means for outputting a release signal to the release signal input/output terminal to release the other camera;

said start signal output means outputting the start signal in a first stroke of the release button of the camera; and said release signal output means outputting the release signal in a second stroke of the release button of the camera.

In accordance with another aspect of the present invention, a camera whose release button is to be depressed does not output a release signal when it detects that the other camera is in a previous release sequence and in a release inhibit status.

In accordance with a further aspect of the present invention, even if a camera to be interconnected has only release input means so that it is not possible to detect whether that camera is in the release inhibit status or not, the plurality of cameras can be simultaneously released. To this end, a release output of the camera whose release button is to be depressed is a pulse output having a predetermined duration so that the release timings of other cameras are synchronized.

BRIEF DESCRIPTION OF THE DRAWINGS

FIG. 3 shows a configuration of two cameras shown in FIG. 2 which are connected through connectors, FIGS. 4 and 5 show time charts of the drive for the two cameras connected as shown in FIG. 2, FIG. 7 shows a configuration of two cameras shown in FIG. 6 which are connected through connectors, FIG. 8 shows a time chart of the drive for the two cameras connected as shown in FIG. 7, FIG. 9 shows a plan view of a camera in accordance with a fourth embodiment of the present invention and a camera having a release input terminal, which are connected through connectors, FIG. 10 shows a time chart of the drive for the camera shown in FIG. 9, FIG. 11 shows a time chart of the drive for the two cameras connected as shown in FIG. 9, FIG. 12 shows a plan view of cameras having the same function as that of the fourth embodiment, which are connected through connectors, and FIG. 13 shows a time chart of the drive of simultaneous release of the two cameras connected as shown in FIG. 12.

DETAILED DESCRIPTION OF THE PREFERRED EMBODIMENTS

One embodiment of the present invention is now explained with reference to the drawings.

Figure 1:
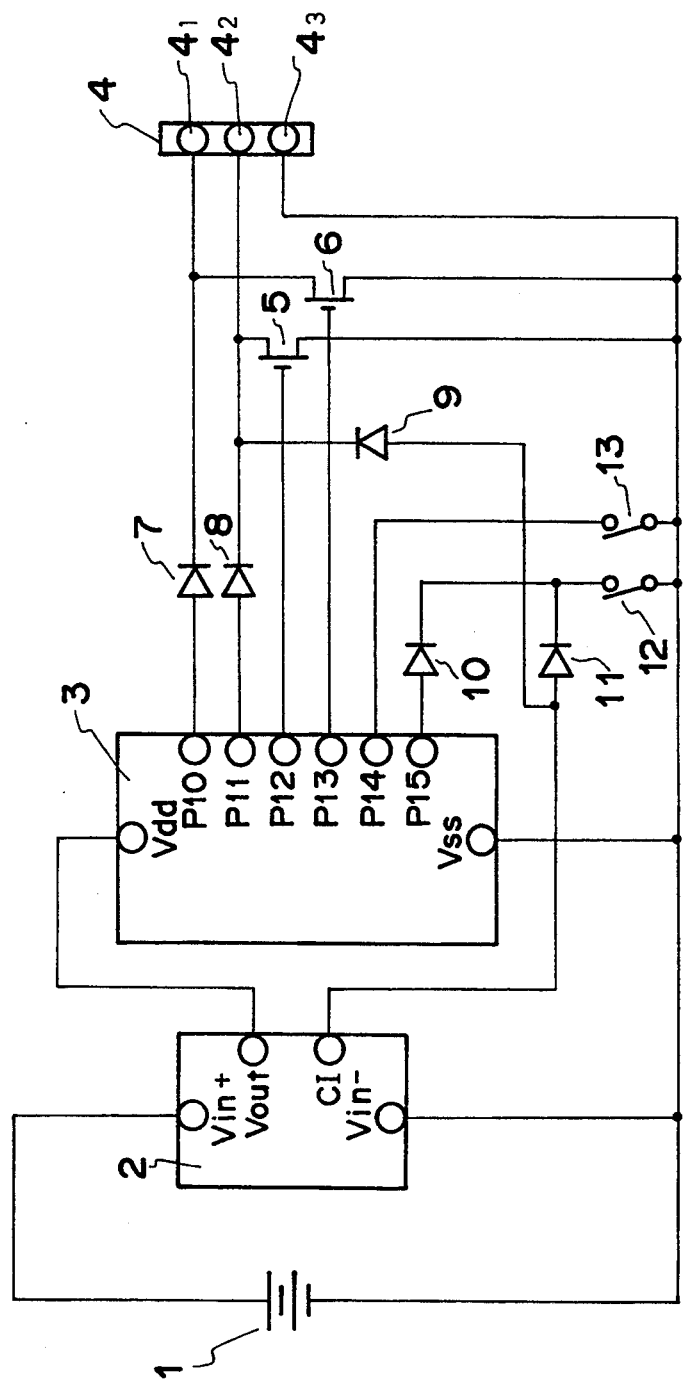
FIG. 1 shows a circuit diagram of a camera in accordance with one embodiment of the present invention.

FIG. 1 shows a circuit diagram of one embodiment of the camera of the present invention. In FIG. 1, numeral 1 denotes a battery, numeral 2 denotes a DC-DC converter for converting a voltage of the battery 1 to a stabilized voltage, numeral 3 denotes a microcomputer (controller portion) for controlling the camera, numeral 4 denotes a connector (communication portion) having a release terminal $4_1$, a start terminal $4_2$ and a GND terminal $4_3$, numerals 5 and 6 denote transistors, numerals 7–11 denote diodes and numerals 12 and 13 denote switches which are turned on and off in response to the depression of a release button of the camera.

The DC-DC converter 2 has a power input terminal $V_{in}{}^+$, a power input terminal $V_{in}{}^-$, an output terminal $V_{out}$ which supplies the stabilized voltage to a circuit in the camera and a control terminal CI for turning on and off the output terminal $V_{out}$. When the terminal CI is grounded, the DC-DC converter 2 is activated to output the stabilized voltage from the output terminal $V_{out}$.

The microcomputer 3 has a power supply terminal $V_{dd}$, a power supply terminal $V_{ss}$ and input/output ports P10–P15. The port P10 is an input port which is connected to the release terminal $4_1$ of the connector 4, the port P11 is an input port which is connected to the start terminal $4_2$ of the connector, the ports P12 and P13 are output ports which are connected to gates of the transistors 5 and 6, respectively, the port P14 is an input port which receives a release signal, and the port P15 is an input port which receives the start signal of the camera. The switches 12 and 13 are mounted on a body of the camera as a release button (release member). The switch 12 is turned on in a first stroke of the release button, and the switch 13 is turned on in a second stroke of the release button. When the switch 12 is turned on, the input terminal CI of the DC-DC connector 2 is grounded through the diode 11 so that the DC-DC converter 2 is activated, the voltage is supplied from the output terminal $V_{out}$, the power is supplied to the microcomputer 3 and other circuit (not shown) and the camera is started. The status of the switch 12 is also applied to the port P15 of the microcomputer 3 through the diode 10 so that the camera is activated and the operation of the DC-DC converter 2 is maintained for a certain time period by a power hold circuit (not shown). The switch 13 is turned on in the second stroke of the release button and the signal is applied to the port P14 of the microcomputer 3. When the port P14 is grounded, the camera starts the release operation.

The start terminal $4_2$ of the connector 4 is connected to the cathodes of the diodes 8 and 9 and the drain of the transistor 5. When the start terminal $4_2$ is grounded, the same status as that in the first stroke of the release button takes place and the camera is started. The release terminal $4_1$ is connected to the port P10 of the microcomputer 3 and the drain of the transistor 6 through the diode 7. When the release terminal $4_1$ is grounded, the microcomputer 3 recognizes it as input of the release signal and the camera is released. That is, when the switch 12 is turned on in the first stroke of the release button or the start terminal $4_2$ of the connector 4 is grounded, the DC-DC converter 2 is activated and the microcomputer 3 starts the operation. The turn-on of the switch 12 is detected by the port P15 of the microcomputer 3 and the grounding of the start terminal $4_2$ of the connector 4 is detected by the port P11 of the microcomputer 3, and the camera starts the operation in response to the detection signal. Further, the signal of the switch 13 which is turned on in the second stroke of the release button and the signal produced when the release terminal $4_1$ of the connector 4 is grounded are detected by the port P14 and the port P10 of the microcomputer 3, respectively, and the camera is released.

In the present invention, the switch 12 is turned on in the first stroke of the release button, and when the start signal of the camera is applied, the output of the port P12 is changed to "H" to turn on the transistor 5. The switch 13 is turned on in the second stroke of the release button, and when the release signal of the camera is applied, the output of the port P13 is changed to H to turn on the transistor 6. Since the depression of the release button and the release operation turn on the transistors 5 and 6, respectively, the start terminal $4_2$ and the release terminal $4_1$ of the connector 4 output "L", respectively. When another camera having the same connector is connected to the GND terminal $4_3$, the start terminal $4_2$ and the release terminal $4_1$ through the connector 4, the start signal and the release signal are transmitted to the other camera.

An embodiment in accordance with a second aspect of the present invention is now explained.

Figure 2:
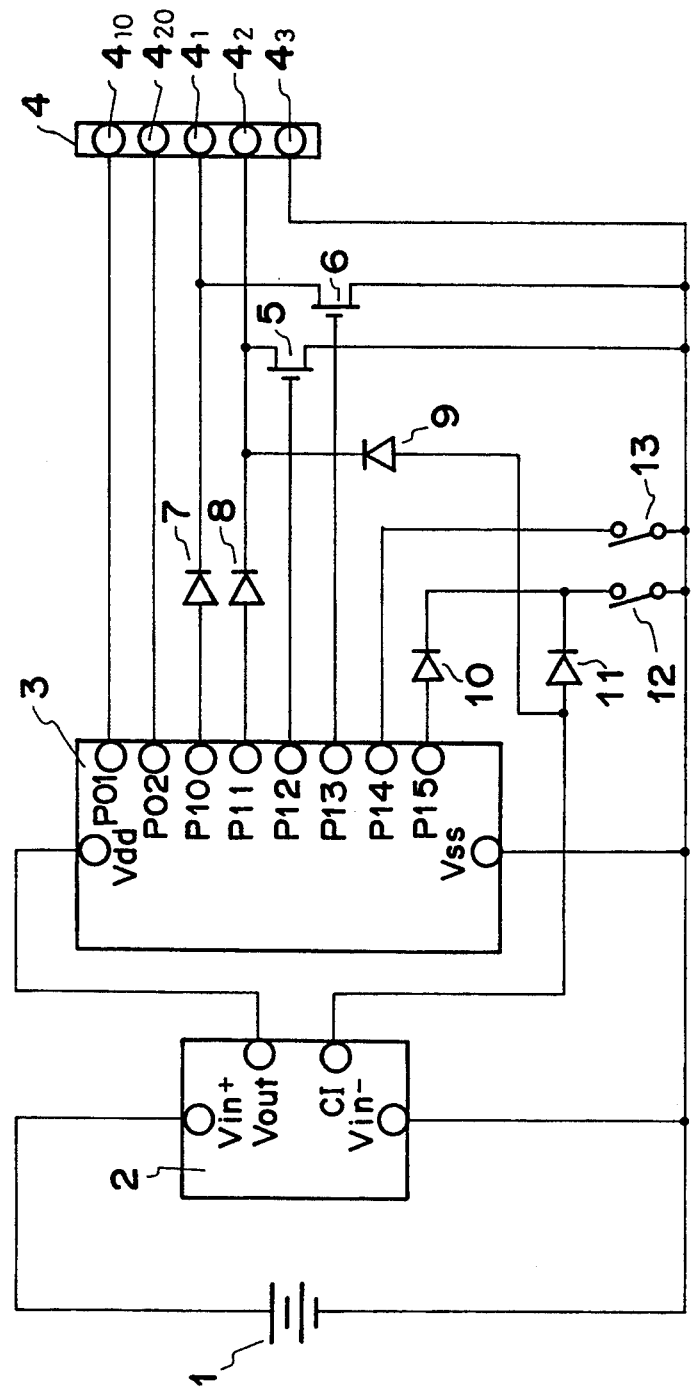
FIG. 2 shows a circuit diagram of a camera in accordance with another embodiment of the present invention.

FIG. 2 shows a circuit diagram of the second embodiment of the camera of the present invention. In FIG. 2, the like numerals to those shown in FIG. 1 designate the like elements and the explanation thereof is omitted. The second embodiment differs from the first embodiment in that the microcomputer 3 additionally has an input port P01 which is connected to the input terminal $4_{10}$ of the connector 4, and an output port P02 which is connected to the output terminal $4_{20}$ of the connector 4.

The operation associated with the added elements is explained below. When the camera is released by a release signal applied to the release terminal $4_1$ of the connector 4, a predetermined signal is outputted from the output port P02 of the microcomputer 3 during the release sequence of the camera (the turn-up of the mirror, the shutter control and the wind-up of the film).

On the other hand, in the release operation by the release button, a predetermined signal may be applied to the input port P01 of the microcomputer 3. If the predetermined signal is not applied, the port P13 is changed to "H" to output the release signal from the release terminal $4_1$ of the connector 4, and if the predetermined signal is applied, the output of the release signal from the release terminal $4_1$ of the connector 4 is inhibited.

When two cameras of such a configuration are connected through the connectors, the second camera is released simultaneously with the release operation of the first camera. If the release button of the first camera is depressed during the release sequence of the second camera, the signal indicating the release sequence is applied from the second camera to the first camera so that the output of the release signal from the first camera is inhibited. By inhibiting the release of the first camera under such a condition, the two cameras are simultaneously inhibited for the release.

FIG. 3 shows a connection diagram of the two cameras connected through the connectors. The GND terminal $4_3$, the start terminal $4_2$ and the release terminal $4_1$ of the connector terminal 4 of the first camera 21 are connected to the GND terminal $4_3$, the start terminal $4_2$ and the release terminal $4_1$ of the connector terminal 4 of the second camera 22, respectively. The output terminal $4_{20}$ of the first camera 21 is connected to the input terminal $4_{10}$ of the second camera 22, and the input terminal $4_{10}$ of the first camera 21 is connected to the output terminal $4_{20}$ of the second camera 22. Numerals $21_1$ and $22_1$ denote release buttons of the first camera 21 and the second camera 22, respectively.

FIG. 4 shows a time chart of the drive for the two cameras connected as shown in FIG. 3.

In FIG. 4(a), the operation of the first camera 21 in FIG. 3 is explained. Before a time T0, the output of the output port P02 of the first camera 21 is "H", and the input to the input port P01 of the first camera, that is, the output of the output port P02 of the second camera 22 is also "H". Accordingly, they indicate that none of the two cameras is in the release inhibit status. When the first camera 21 is released at the time T0, the release signal is outputted from the release terminal $4_1$ of the connector 4. Thus, the first camera 21 and the second camera 22 are released. The release sequence is started at a time T1 and the first camera 21 and the second camera 22 output the signals indicating the release sequence from the respective output port P02. Accordingly, the signal indicating the release sequence of the second camera 22 is applied to the input port P01 of the first camera 21. At this time (T1), the output of the release signal of the first camera 21 is inhibited and the output of the release signal of the first camera 21 is stopped. At a time T3, the depression of the release button $21_1$ of the first camera 21 is terminated. At a time T4, the output of the output port P02 changes to "H" to indicate the end of the release sequence of the first camera 21. At a time T5, the input to the input port P01 changes to "H" to indicate the end of the release sequence of the second camera 22.

FIG. 5 shows a time chart of the release operation of the first camera 21 when the second camera 22 is in the release inhibit status. At a time T10, the release button $21_1$ of the first camera 21 is depressed. Since the input to the input port P01 is "L" at this time, that is, since the second camera 22 is in the release inhibit status, the first camera 21 does not output the release signal. At a time T11, the input to the input port P01 changes to "H" so that the first camera 21 outputs the release signal. At a time T12, the first camera 21 and the second camera 22 go into the release sequence, and the output of the output port P02 of the first camera 21 changes to "L" and the signal indicating the release sequence of the second camera 22 is applied to the input port P01. Thus, the first camera is in the condition to inhibit the output of the release signal, and the ouput of the release signal of the first camera is stopped at the time T12. At a time T13, the release button $21_1$ of the first camera 21 is no longer depressed and the release sequence of the first camera 21 is terminated at a time T14. Thus, the output of the output port P02 changes to "H". At a time T15, the release sequence of the second camera 22 is terminated and the output of the output port P02 of the second camera 22, that is, the input to the input port P01 of the first camera 21 changes to "H". In this manner, the two cameras are released simultaneously by the release operation in one camera.

When the camera is in a continuous release status (the release button is continuously depressed to maintain the continuous release status), the release button $21_1$ is kept depressed as shown by a broken line prior to the release button depression time T10 in FIG. 5. However, since the second camera 22 is in the release inhibit status until the time T11, none of the first camera 21 and the second camera 22 goes into the release operation until the inhibit status is terminated. It is assumed here that the release sequence of the second camera 22 is longer than the release sequence of the first camera 21. If the release sequence of the first camera 21 is longer, the first camera 21 can determine the end of the release sequence of its own. Thus, the release signal is outputted to the second camera 22 at the end of the release sequence of the first camera 21 and the first camera 21 also starts the release operation.

In the above operation, the second camera 22 is controlled by the release operation of the first camera 21. Alternatively, the first camera 21 may be controlled by the release operation of the second camera 22.

Only the camera which is released detects the release inhibit status of the other camera and the other camera need not detect the release inhibit status of the camera which is released. Accordingly, whether the release inhibit status is to be inputted or outputted can be determined if means for determining whether the release button was depressed or the release operation was done by the signal at the release terminal $4_1$ of the connector 4 is provided. Accordingly, the input port P01 and the output port P02 may share one input/output terminal. Thus, when the release button is depressed, the release inhibit status of the other camera is inputted, and when the release operation is done by the signal at the release terminal $4_1$ of the connector 4, the release inhibit status is outputted.

Figure 6:
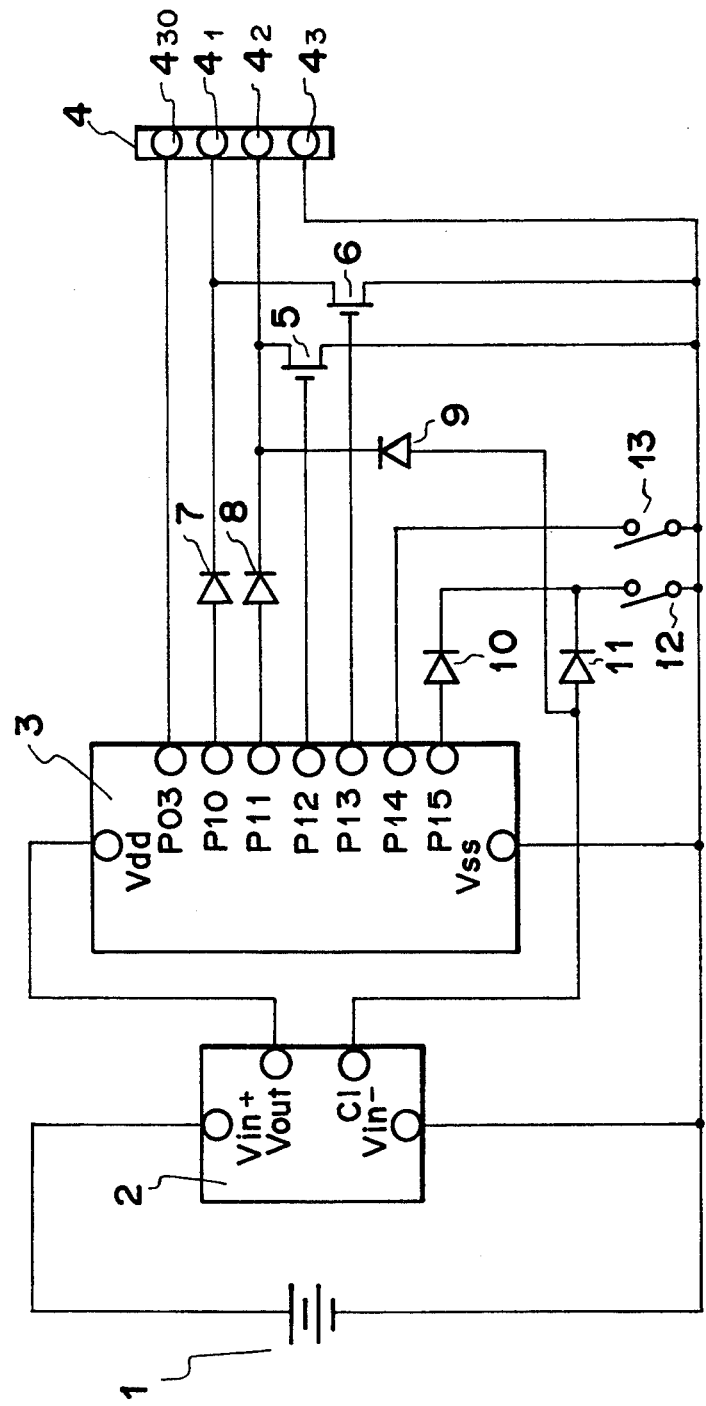
FIG. 6 shows a circuit diagram of a camera in accordance with a further embodiment of the present invention.

FIG. 6 shows an embodiment (third embodiment) of the camera of the present invention. It differs from FIG. 2 in that the port P03 of the microcomputer 3 is an input/output switchable port which is connected to an input/output terminal $4_{30}$ of the connector 4. Accordingly, compared to FIG. 2, the number of ports of the microcomputer 3 and the number of terminals of the connector may be one less, respectively. The two cameras of such a configuration are connected to interconnect the GND terminals, the start terminals, the release terminals and the input/output terminals thereof, respectively, to attain the same function as that described above. FIG. 7 shows a diagram therefor, and FIG. 8 shows a time chart thereof. In the time chart of FIG. 8, the release sequence shows the internal status of the camera whose release button $21_1$ is depressed (the first camera 21 in this case). When the release button $21_1$ of the first camera 21 is depressed, the first camera 21 sets the input/output port P03 to the input port to receive the signal of the second camera 22. At a time T20, the release button $21_1$ is depressed. Since none of the first camera 21 and the second camera 22 is in the release inhibit status at this time, the release signal is outputted from the first camera 21. Thus, at a time T21, the first camera 21 starts the release operation and the second camera 22 also starts the release operation. Since the second camera 22 receives the release signal from the release terminal $4_1$ of the connector 4, the input/output port P03 of the second camera 22 functions as the output port which indicates the release sequence. As the second camera 22 goes into the release sequence, it outputs "L" to the input/output port P03. Since the first camera 21 is in the release inhibit status at this time, the output of the release signal is stopped at a time T21. At a time T22, the release button $21_1$ of the first camera 21 is no longer depressed. At a time T23, the first camera 21 terminates the release sequence, and at a time T24, the second camera 22 terminates the release sequence.

An embodiment (fourth embodiment) in accordance with the third aspect of the present invention is now explained. A circuit configuration of the camera of the present embodiment is identical to that of the second embodiment shown in FIG. 2 except the configuration of the microcomputer 3, which has clock means and operates at a different timing than the second embodiment.

FIG. 9 shows a connection diagram of a camera 23 having a release button $23_1$, and a camera 24 having a release terminal $4_1$ a start terminal $4_2$ and a GND terminal $4_3$, connected through the connectors 4. The GND terminal $4_3$, the start terminal $4_2$ and the release terminal $4_1$ of the camera 23 are connected to the GND terminal $4_3$, the start terminal $4_2$ and the release terminal $4_1$ of the camera 21, respectively. Numeral $24_1$ denotes a release button of the camera 24.

FIG. 10 shows a time chart of the drive for the two cameras connected as shown in FIG. 9. The operation of the camera 23 in FIG. 9 is explained below. Before a time T10, the output of the port P02 of the camera 23, that is, the release sequence signal of the camera 23 is "H" and the input to the port P01 is "H" because of no connection. Thus, it is determined that the camera 24 is always in a release enable status. It shows that none of the two cameras is in the release inhibit status. When the release button of the camera 23 is depressed at the time T10, the release signal is outputted from the release terminal $4_1$ of the connector 4. Thus, the cameras 23 and 24 are released thereby. At a time T11, the release sequence is started and the cameras 23 and 24 output the signals indicating the release sequence at the respective ports P02. At a time T12, the end of the release sequence of the camera 24 is detected. At a time T13, the output of the port P02 changes to "H" to indicate the end of the release sequence of the camera 23. Since the release button of the camera 23 is kept depressed, the camera 24 is released at a time T14 and the camera 23 is released at a time T15. Thus, the simultaneous release of the two cameras is not attained. At a time T16, the release button operation of the camera 23 is terminated and the output of the release signal is stopped. At a time T17, the release operation of the camera 24 is terminated, and at a time T18, the release operation of the camera 23 is terminated. Thus, at the time T11, the first release operation is attained simultaneously in the two cameras, but the second release operation is attained at the time T15 in the camera 23 and at the time T14 in the camera 24. Thus, the two cameras are not simultaneously released.

In the present embodiment, the output of the release signal is produced only for a predetermined period even if the release button is kept depressed.

FIG. 11 shows an operation sequence of the present embodiment. At a time T20, the release button of the camera 23 is depressed, and the camera 23 outputs the release signal and goes into the release sequence. At a time T21, the release sequence of both cameras is started. At a time T22 when the predetermined time has elapsed by the clock means of the microcomputer 3, the output of the release signal is stopped without regard to the depression of the release button $23_1$ of the camera 23. At a time T23, the release sequence of the camera 24 is terminated, and at a time T24, the release sequence of the camera 23 is terminated. Thus, the camera 23 again outputs the release signal so that the camera 24 is released and the camera 23 also goes into the release sequence (at a time T25). At a time T26 when the predetermined time period has elapsed, the camera 23 stops the output of the release signal. At a time T27, the depression of the release button $23_1$ of the camera 23 is terminated. At a time T28, the release sequence of the camera 24 is terminated. At a time T29, the release sequence of the camera 23 is terminated. In this manner, the output of the release signal is limited to a certain time, that is, the time periods T20-T22 and T24-T26 without regard to the depression of the release button $23_1$ of the camera 23 so that the simultaneous release in the two cameras is attained even if the camera 24 has no output for the release sequence. This period is set shorter than the period of one release sequence of the camera to prevent the release for two frames by the output of one release signal.

FIG. 12 shows a connection when two cameras of the present invention are connected. The GND terminal $4_3$, the start terminal $4_2$ and the release terminal $4_1$ of the connector 4 of the camera 23 are connected to the GND terminal $4_3$, the start terminal $4_2$ and the release terminal $4_1$ of the connector 4 of the camera 25, respectively. The input terminal $4_{10}$ of the camera 23 is connected to the output terminal $4_{20}$ of the camera 25, and the output terminal $4_{20}$ of the camera 23 is connected to the input terminal $4_{10}$ of the camera 25. Accordingly, the signal indicating the release sequence of each of the two cameras is applied to the other camera, numeral $25_1$ denotes a release button of the camera 25.

FIG. 13 shows a simultaneous release sequence of the two cameras connected as described above. It is assumed that the release button $23_1$ of the camera 23 is depressed. Before a time T0, the output of the port P02 and the input to the port P01 of the camera 23 are "H". This indicates that none of the cameras 23 and 25 is in the release sequence. Accordingly, both of the two cameras are in the release enable status. At the time T0, the release button $23_1$ of the camera 23 is depressed and the release signal is outputted from the release terminal $4_1$ of the connector 4 of the camera 23. Thus, at a time T1, the two cameras go into the release sequence. Thus, the port P02 of the camera 23 outputs "L" and the port P01 receives the signal "L" which indicates that the camera 24 is in the release sequence. At a time T2 when a predetermined time has elapsed, the camera 23 stops the output of the release signal without regard to the status of the release button $23_1$ of the camera 23. At a time T3, the release sequence of the camera 23 is terminated, and at a time T4, the release sequence of the camera 25 is terminated. Since the release button $23_1$ of the camera 23 is kept depressed at this time, the camera 23 again outputs the release signal at a time T4 when both cameras are ready to be released again. Thus, at a time T5, the release operations of the cameras 23 and 25 are started. At a time T6 when a predetermined time has elapsed from the time T4, the output of the release signal of the camera 23 is stopped. At a time T8, the release sequence of the camera 23 is terminated and at a time T9, the release sequence of the camera 25 is terminated. Since the release button $23_1$ of the camera 23 stopped being depressed at the time T7, the next release signal is not outputted at the time T9.

The connection of the cameras 23 and 25 is symmetric as seen from FIG. 12. Accordingly, the simultaneous release of the camera 23 may be attained by manipulating the camera 25.

What is claimed is:

1. For use in a system in which a plurality of cameras can be controlled by signal communication between cameras, at least one camera comprising:
   a controller portion for controlling the performance of a camera release sequence in said one camera and for transmitting and receiving signals;
   a communication portion connected to said controller portion and having a release signal terminal capable of applying to said controller portion a release signal received from another camera and capable of transmitting a release signal from said controller portion to another camera; and
   a release member;
   said controller portion being responsive to a release signal received by said release signal terminal for starting a release sequence in said one camera and also being responsive to operation of said release member for starting a release sequence in said one camera, said controller portion applying a release signal to said release signal terminal for transmission to another camera when said release sequence is performed in said one camera in response to operation of said release member, whereby another camera can perform a release sequence concurrently with said one camera.

2. A camera according to claim 1, wherein said communication portion has another signal terminal for applying to said controller portion a predetermined signal received from another camera and wherein, when said another signal terminal receives said predetermined signal, said controller portion inhibits starting of a release sequence in said one camera in response to operation of said release member and inhibits said applying of said release signal to said release signal terminal.

3. A camera according to claim 2, wherein said controller portion continues a release sequence in said one camera, started in response to operation of said release member, when said another signal terminal receives said predetermined signal.

4. A camera according to claim 1, wherein said communication portion has another signal terminal for transmitting a predetermined signal from said controller portion to another camera, and wherein when said controller portion starts a release sequence in said one camera, said controller portion applies said predetermined signal to said another signal terminal for inhibiting the receipt of a release signal by said release signal terminal.

5. A system according to claim 1, wherein said communication portion has another signal terminal capable of transmitting a predetermined signal from said controller portion to another camera and capable of applying to said controller portion a predetermined signal received from another camera, said another signal terminal being connected to a port of said controller portion that is capable of being set in an input state or an output state by said controller portion, said port being set in an input state for receiving a predetermined signal from another camera when said controller portion starts a release sequence in said one camera in response to operation of said release member, said port being set in an output state for transmitting a predetermined signal to another camera when said controller portion starts a release sequence in said one camera in response to a release sisal received by said release signal terminal.

6. A system according to claim 5, wherein said controller portion inhibits starting of a release sequence in said one camera in response to operation of said release member when a predetermined signal is applied to said another signal terminal.

7. A camera according to claim 1, wherein said communication portion has another signal terminal capable of receiving a start signal from another camera and capable of transmitting a start signal to another camera, wherein a received start signal enables the operation of said controller portion, wherein said release member has a first stroke and a second stroke, and wherein said release member causes a start signal to be applied to said another signal terminal in said first stroke and causes said controller portion to apply a release signal to said release terminal in said second stroke.

8. A camera according to claim 1, wherein said controller portion terminates the applying of a release signal to said release terminal, when a predetermined period of time has elapsed from commencement of the operation of said release member, without regard to whether or not the operation of said release member has terminated.

9. A camera control system including a pair of cameras, each of which is capable of controlling the other by communication between the cameras, wherein each camera comprises:

a controller portion for controlling the performance of a camera release sequence in the same camera and for transmitting and receiving signals to and from the other camera; and a release member;

said controller portion being responsive to operation of said release member for starting a release sequence in the same camera and being responsive to a release signal received from the other camera for starting said release sequence; and wherein the controller portion of either one of said cameras transmits a release signal to the other camera when the release sequence is started in said one camera in response to the operation of a release member in said one camera.

10. A system according to claim 9, wherein when the controller portion of either one of said cameras starts a release sequence, said controller portion also transmits an inhibit signal to the other camera for inhibiting the transmission of a release signal from the other camera.

11. A system according to claim 9, wherein when the controller portion of either one of said cameras starts a release sequence in response to the operation of a release member in said one camera, the controller portion transmits a release signal to the other camera for a predetermined period of time regardless of whether or not the operation of the release member is terminated.

12. A system according to claim 9, wherein, for communication between said cameras, each camera has a release signal terminal connected to a release signal terminal of the other camera for transmitting a release signal from the controller portion of each camera to the controller portion of the other camera.

13. A system according to claim 12, wherein each camera has another signal terminal connected to another signal terminal of the other camera for transmitting from each camera to the other camera a start signal for enabling the operation of the controller portion of the other camera.

14. A system according to claim 12, wherein each camera has an inhibit signal input terminal and an inhibit signal output terminal connected to the controller portion of the same camera, wherein the inhibit signal input terminal of each camera is connected to the inhibit signal output terminal of the other camera, and wherein when a release sequence is performed in either one of the cameras, the controller portion of the same camera applies an inhibit signal to the inhibit signal output terminal of the camera, whereby an inhibit signal is applied to the inhibit signal input terminal of the other camera, and wherein when an inhibit signal is applied to an inhibit signal input terminal of either one of the cameras, the controller portion connected to the inhibit signal input terminal of the same camera terminates the application of a release signal to the release signal terminal of the same camera.

15. A system according to claim 12, wherein each camera has another signal terminal connected to a port of the controller portion of the same camera and connected to another signal terminal of the other camera, and wherein the port of each camera is capable of being set in an input state or an output state by the controller portion of the same camera and is set in an input state when the controller portion of the same camera starts a release sequence in response to the operation of the release member of the same camera and is set in an output state when a release sequence in the same camera is started in response to a release signal received from the other camera.

* * * * *